US009416725B2

(12) United States Patent
Uehane et al.

(10) Patent No.: US 9,416,725 B2
(45) Date of Patent: Aug. 16, 2016

(54) TURBOCHARGING DEVICE OF ENGINE FOR VEHICLE

(71) Applicant: Mazda Motor Corporation, Aki-gun, Hiroshima (JP)

(72) Inventors: Yoshiyuki Uehane, Hiroshima (JP); Junji Umemura, Aki-gun (JP); Atsuhiro Hatabu, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 16 days.

(21) Appl. No.: 14/462,486

(22) Filed: Aug. 18, 2014

(65) Prior Publication Data

US 2015/0052891 A1    Feb. 26, 2015

(30) Foreign Application Priority Data

Aug. 26, 2013   (JP) .................................. 2013-174164

(51) Int. Cl.
| F02B 33/44 | (2006.01) |
| F02B 37/12 | (2006.01) |
| F02B 37/00 | (2006.01) |
| F02B 37/16 | (2006.01) |
| F02B 37/18 | (2006.01) |

(52) U.S. Cl.
CPC ............. *F02B 37/127* (2013.01); *F02B 37/004* (2013.01); *F02B 37/16* (2013.01); *F02B 37/18* (2013.01); *Y02T 10/144* (2013.01)

(58) Field of Classification Search
CPC ...... F02B 37/004; F02B 37/127; F02B 37/16; F02B 37/18; F02M 25/0707; F02M 25/0709; F02M 25/0728; F02M 25/0731
See application file for complete search history.

(56) References Cited

U.S. PATENT DOCUMENTS

| 4,282,713 | A * | 8/1981 | Antoku | .................... | F02B 37/16 60/600 |
| 7,168,250 | B2 * | 1/2007 | Wei | ........................ | F02B 37/013 123/568.12 |
| 2005/0193732 | A1 * | 9/2005 | LaRue | .................. | F01D 25/125 60/605.1 |
| 2007/0084194 | A1 * | 4/2007 | Holm | .................... | F01M 13/021 60/283 |
| 2007/0137199 | A1 * | 6/2007 | Magner | ................. | F02B 37/127 60/602 |
| 2009/0293852 | A1 * | 12/2009 | Frick | ....................... | F02M 25/06 123/573 |
| 2010/0071365 | A1 * | 3/2010 | Laermann | ............... | F01N 3/021 60/605.2 |
| 2013/0211693 | A1 * | 8/2013 | Petrovic | ................ | F02D 41/182 701/104 |
| 2014/0047834 | A1 * | 2/2014 | Polkus | .................... | F02D 23/00 60/602 |
| 2014/0130783 | A1 * | 5/2014 | Takaki | .................... | F02B 37/00 123/568.11 |
| 2014/0318514 | A1 * | 10/2014 | Pursifull | .............. | F01M 13/022 123/568.29 |

FOREIGN PATENT DOCUMENTS

JP    2012012990 A    1/2012

* cited by examiner

*Primary Examiner* — Jesse Bogue
(74) *Attorney, Agent, or Firm* — Alleman Hall McCoy Russell & Tuttle LLP (57) ABSTRACT

A turbocharging device of an engine for a vehicle is provided. The turbocharging device includes a turbocharger for turbocharging intake air, an introduction passage connected to an introducing section of a compressor of the turbocharger, a discharge passage connected to a discharging section of the compressor of the turbocharger, a bypass passage connecting the introduction passage to the discharge passage and bypassing the compressor, and a bypass valve for opening and closing the bypass passage. A throttle part throttling a flow passage area of the introduction passage is formed in an inner circumferential surface of a part of the introduction passage, upstream of a connection part of the introduction passage with the bypass passage.

9 Claims, 11 Drawing Sheets

TURBOCHARGING DEVICE OF ENGINE FOR VEHICLE

BACKGROUND

The present invention relates to a turbocharging device of an engine for a vehicle.

Conventionally, turbochargers have been provided to vehicles so as to supply a larger amount of intake air to engines. Moreover, devices are known that are each provided with a bypass passage bypassing a compressor of the turbocharger and a bypass valve for opening and closing the bypass passage, and switches, according to an operating condition of the engine, between a mode for forcibly inducting intake air by the turbocharger and a mode for leading the intake air to the bypass passage and not performing the turbocharging.

For example, JP2012-012990A discloses a device including two turbochargers, a bypass passage for bypassing compressors of the turbochargers, and a bypass valve for opening and closing the bypass passage. The device switches the turbocharger to operate according to the operating condition of the engine.

As described above, with such a device including two turbochargers, the bypass passage bypassing compressors of the turbochargers, and the bypass valve for opening and closing the bypass passage, oil contained in the intake air passing through the bypass passage adheres on the bypass valve, particularly a seating face of the bypass valve, becomes sticky, and stops the movement of the bypass valve or slows down the movement of the bypass valve. Thus, there is a case where a suitable intake control cannot be achieved.

SUMMARY

The present invention is made in view of the above situations and aims to provide a turbocharging device of an engine for a vehicle, which achieves a suitable intake control by maintaining smooth operation of a bypass valve provided in a bypass passage bypassing a turbocharger.

According to one aspect to the present invention, a turbocharging device of an engine for a vehicle is provided. The turbocharging device includes a turbocharger for turbocharging intake air, an introduction passage connected to an introducing section of a compressor of the turbocharger, a discharge passage connected to a discharging section of the compressor of the turbocharger, a bypass passage connecting the introduction passage to the discharge passage and bypassing the compressor, and a bypass valve for opening and closing the bypass passage. A throttle part throttling a flow passage area of the introduction passage is formed in an inner circumferential surface of a part of the introduction passage, upstream of a connection part of the introduction passage with the bypass passage.

According to this device, with the simple configuration of providing the throttle part in the part of the inner circumferential surface of the introduction passage, the throttle part increases a flow rate of intake air introduced into the bypass passage to suppress adhesion of oil on the bypass valve. Thus, smooth movement of the bypass valve can be maintained.

The turbocharging device is preferred to also include an upstream turbocharger for turbocharging intake air. The introduction passage preferred to connect a discharging section of a compressor of the upstream turbocharger with the introducing section of the turbocharger.

In this manner, smooth movement of the bypass valve can be maintained while achieving high pressurization of intake air by the turbocharger. Specifically, in the case where the upstream turbocharger is provided upstream of the turbocharger, since high-pressure, high-temperature intake air produced by the upstream turbocharger flows into the bypass passage, the oil adheres on the bypass valve and easily becomes sticky. However, with the present invention, the increased flow rate of the intake air introduced into the bypass passage suppresses the adhesion of oil on the bypass valve, and thus, smooth movement of the bypass valve can be maintained while performing the turbocharging by the upstream turbocharger.

Moreover, a curving section is preferred to be formed in the inner circumferential surface of the introduction passage. The throttle part is preferred to be formed in a part of the curving section, on an inner side inward of a central axis of the curving section in terms of a curvature radius.

In this manner, interruption of the entire flow of intake air passing through the introduction passage by the throttle part is suppressed and the flow rate of intake air can more surely be increased.

Moreover, the introduction passage is preferred to include an upstream passage and a volume section having a bottom face where the intake air passed through the upstream passage blows back to an upstream side. A protrusion protruding inside the introduction passage is preferred to be formed in a part of an inner circumferential surface of the introduction passage, downstream of a stagnation point of the intake air blowing back upward from the bottom face of the volume section.

Here, if the increase in the flow rate of intake air is attempted with the volume section having the bottom face provided in the introduction passage so that intake air collides with the bottom face and blows back upward, due to the flow of intake air toward the bottom face colliding with the flow of intake air blowing back at high speed, the position of the stagnation point cannot be stable and the flow may become unstable. However, with the above configuration, the protrusion is formed downstream of the stagnation point, and with the protrusion, the collision of the blow-back flow with the stagnation point can be avoided. Therefore, the stable flow can be secured while increasing the flow rate of intake air flowing into the bypass passage.

Moreover, an exhaust gas recirculation (EGR) passage for recirculating exhaust gas discharged from the engine is preferred to be connected to an intake passage connected to the introducing section of the compressor of the turbocharger.

In this manner, smooth movement of the bypass valve can be maintained while introducing the EGR gas into intake air to improve exhaust emission control performance.

Specifically, when the EGR gas is mixed with intake air flowing into the bypass passage, the intake air is increased much higher in temperature, and therefore, the oil adhered on the bypass valve becomes sticky and the movement of the bypass valve easily degrades; however, in the present invention, the adhesion of oil on the bypass valve is suppressed due to the increase in speed of the intake air flowing into the bypass passage, and thus, smooth movement of the bypass valve can be maintained while introducing the EGR gas into intake air.

Moreover, a blowby gas introduction passage for introducing blowby gas into the intake passage connected to the introducing section of the compressor of the turbocharger is preferred to be connected to the intake passage.

In this manner, smooth movement of the bypass valve can be maintained while suitably treating blowby gas.

Specifically, when the blowby gas is mixed with the intake air flowing into the bypass passage, an amount of oil passing through the bypass passage increases and the movement of the bypass valve may degrade; however, in the present invention, the adhesion of oil on the bypass valve is suppressed due to the increase in speed of the intake air flowing into the bypass passage, and thus, smooth movement of the bypass valve can be maintained while introducing the blowby gas into intake air and achieving combustion treatment thereof in the engine.

DETAILED DESCRIPTION OF EMBODIMENT

Hereinafter, one embodiment of the present invention is described in detail with reference to the appended drawings.

Figure 1:
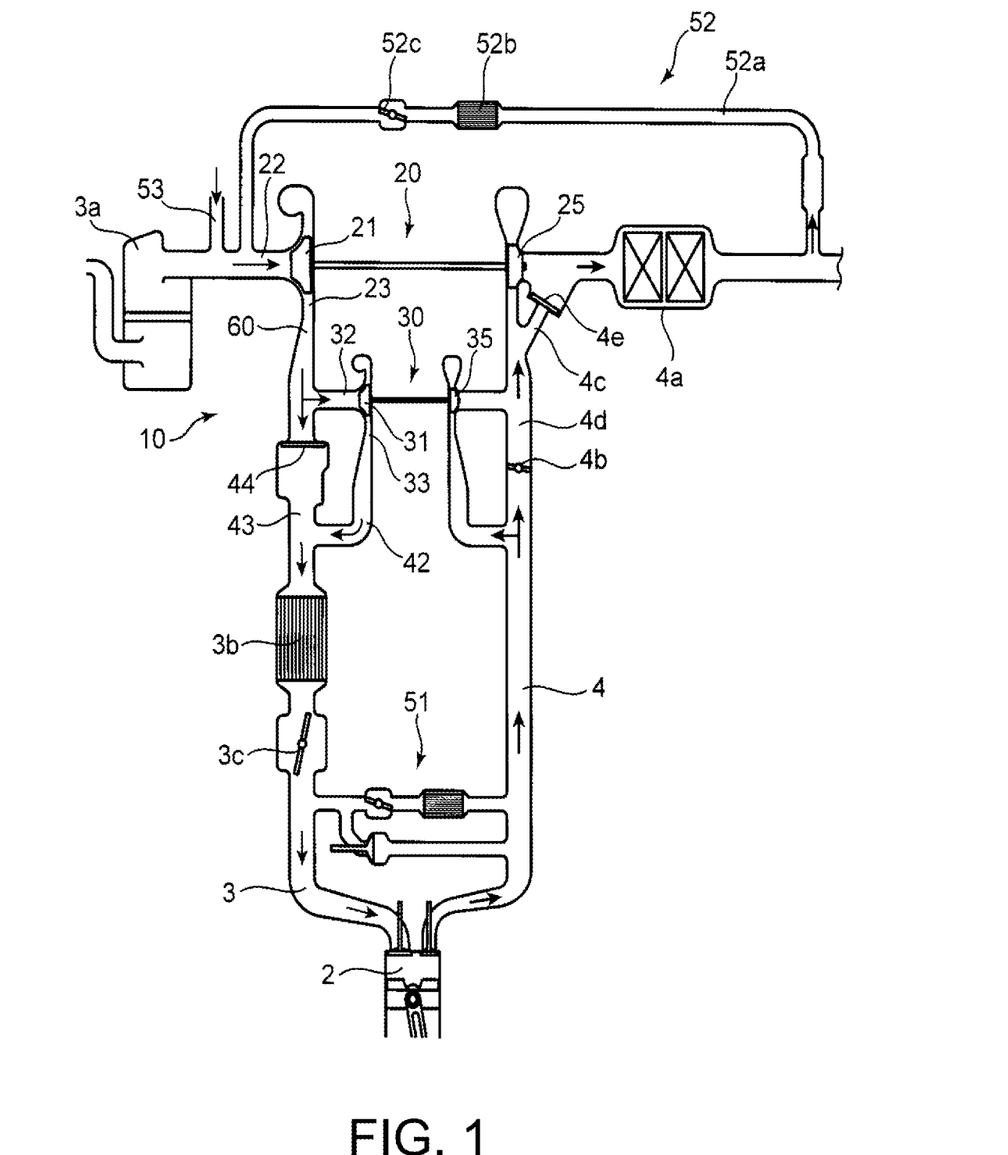
FIG. 1 is a schematic diagram illustrating an intake-exhaust system of an engine for a vehicle, to which a turbocharging device of the engine according to one embodiment of the present invention is applied.

FIG. 1 is a schematic diagram illustrating an intake-exhaust system of a vehicle to which a turbocharging device 10 of an engine 2 according to this embodiment of the present invention is applied. The turbocharging device 10 is a so-called two-stage turbocharging device including a first turbocharger having a larger size (upstream turbocharger) 20, and a second turbocharger having a smaller size (turbocharger) 30.

In an intake passage 3 of the engine 2, from upstream, an air cleaner 3a, a first compressor 21 to serve as a compressor of the first turbocharger 20, a second compressor 31 to serve as a compressor of the second turbocharger 30, an intercooler 3b, and a throttle 3c are disposed. Moreover, the intake passage 3 is provided therein with a compressor-to-compressor passage 60 (introduction passage) connecting a discharging section 23 of the first compressor 21 to an introducing section 32 of the second compressor 31, a discharge passage 42 connected to a discharging section 33 of the second compressor 31, and a bypass passage 43 connecting the compressor-to-compressor passage 60 to the discharge passage 42 and bypassing the second compressor 31. The bypass passage 43 is provided therein with a bypass valve 44 for opening and closing the bypass passage 43. Moreover, a blowby gas introduction passage 53 for introducing blowby gas into the intake passage 3 is connected to a section of the intake passage 3 between the air cleaner 3a and the introducing section 22 of the first compressor 21. The blowby gas is introduced into the engine 2 along with intake air and is combusted within the engine 2.

In an exhaust passage 4 of the engine 2, from upstream, a second turbine 35 to serve as a turbine of the second turbocharger 30, a first turbine 25 to serve as a turbine of the first turbocharger 20, and a catalyst 4a are disposed. Moreover, the exhaust passage 4 is provided therein with a second turbine bypass passage 4d bypassing the second turbine 35, and a first turbine bypass passage 4c bypassing the first turbine 25. The turbine bypass passages 4d and 4c are provided with valves 4b and 4e for opening and closing the turbine bypass passages, respectively.

The valves 44, 4b, and 4e provided to the bypass passages 43, 4d, and 4c, respectively, are opened and closed according to an engine operating condition, to perform one of turbocharging using only the first turbocharger 20, turbocharging using only the second turbocharger 30, turbocharging using both of the turbochargers 20 and 30, and a non-turbocharging operation. For example, within an engine operating range where an engine speed is low and an engine load is low (low-speed, low-load range), the turbocharging using only the second turbocharger 30 is performed, within an engine operating range where the engine speed is medium and the engine load is medium (medium-speed, medium-load range), the turbocharging using both of the turbochargers 20 and 30 is performed, and within an engine operating range where the engine speed is high and the engine load is high (high-speed, high-load range), the turbocharging using only the first turbocharger 20 is performed.

Moreover, in the intake-exhaust system, an HP (High Pressure)-EGR system 51 is provided to improve exhaust emission control performance. The HP-EGR system 51 connects a section of the exhaust passage 4 upstream of the second turbine 35 to a section of the intake passage 3 downstream of the throttle 3c and circulates high-pressure exhaust gas discharged from the engine 2 back to a section where the pressure is comparatively high. Moreover, in the intake-exhaust system, an LP (Low Pressure)-EGR system 52 is provided to improve exhaust emission control performance. The LP-EGR system 52 connects a section of the exhaust passage 4 downstream of the catalyst 4a to a section of the intake passage 3 between the air cleaner 3a and the introducing section 22 of the first compressor 21 and circulates low-pressure exhaust gas discharged from the engine 2 back to a section where the pressure is comparatively low. Specifically, an EGR passage 52a is provided to connect the section of the exhaust passage 4 downstream of the catalyst 4a with the section of the intake passage 3 between the air cleaner 3a and the introducing section 22 of the first compressor 21, and an EGR cooler 52b for cooling EGR gas and an EGR valve 52c for opening and closing the EGR passage 52a are provided to the EGR passage 52a. The exhaust gas is circulated by the EGR systems 51 and 52 suitably according to the engine operating condition.

Here, with this kind of system in which the bypass passage 43 bypassing the second compressor 31 and the bypass valve 44 for opening and closing the bypass passage 43 are provided to the intake passage 3, if oil adheres on the bypass valve 44 and becomes sticky, the movement of the bypass valve 44 becomes slow, and thus, a suitable intake control may not be performed. Particularly, with this kind of system in which the first compressor 21 is provided to the section upstream of the bypass passage 43, due to the turbocharging using only the first compressor 21, a temperature of the intake air flowing into the bypass passage 43 increases and the oil easily becomes sticky. Moreover, with this kind of system in which the EGR passage 52a is connected to the section upstream of the bypass passage 43, the temperature of the intake air is also increased by the EGR gas circulated back to the intake side through the EGR passage 52a, and the oil easily becomes sticky. Furthermore, with this kind of system in which the blowby gas introduction passage 53 is connected to the section upstream of the bypass passage 43, intake air mixed with blowby gas is introduced into the bypass passage 43. Therefore, the oil contained in the blowby gas easily adheres on the bypass valve 44. On the other hand, with the turbocharging device of this embodiment, as described later, a throttle part 65 for throttling a flow passage area of the compressor-to-compressor passage 60 is provided to a section of the compressor-to-compressor passage 60 upstream of a connecting section to the bypass passage 43, so as to increase a flow rate of the intake air passing through the compressor-to-compressor passage 60 by the throttle part 65. Thus, the adhesion of oil on the bypass valve 44 can be suppressed.

Figure 2:
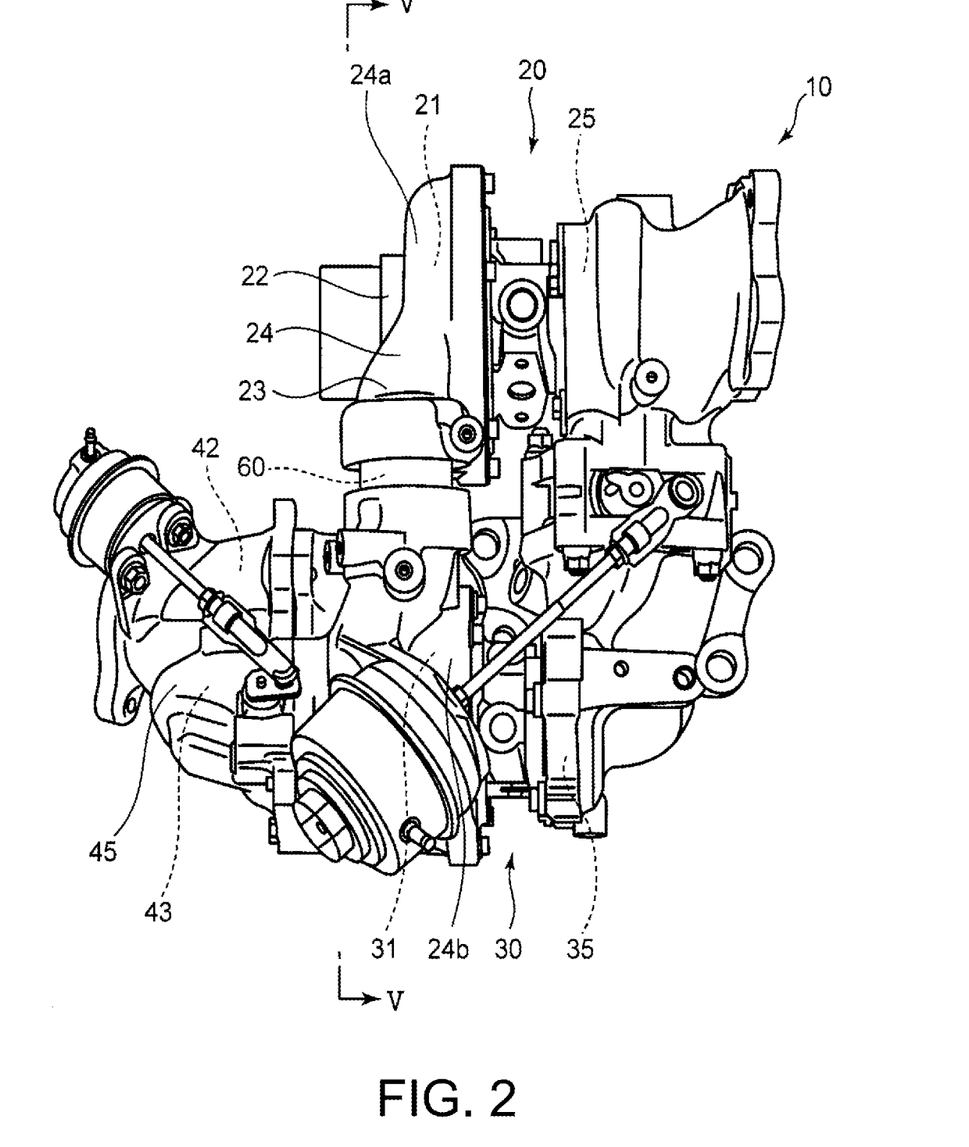
FIG. 2 is a front view illustrating a part of the turbocharging device of the engine for the vehicle.
Figure 3:
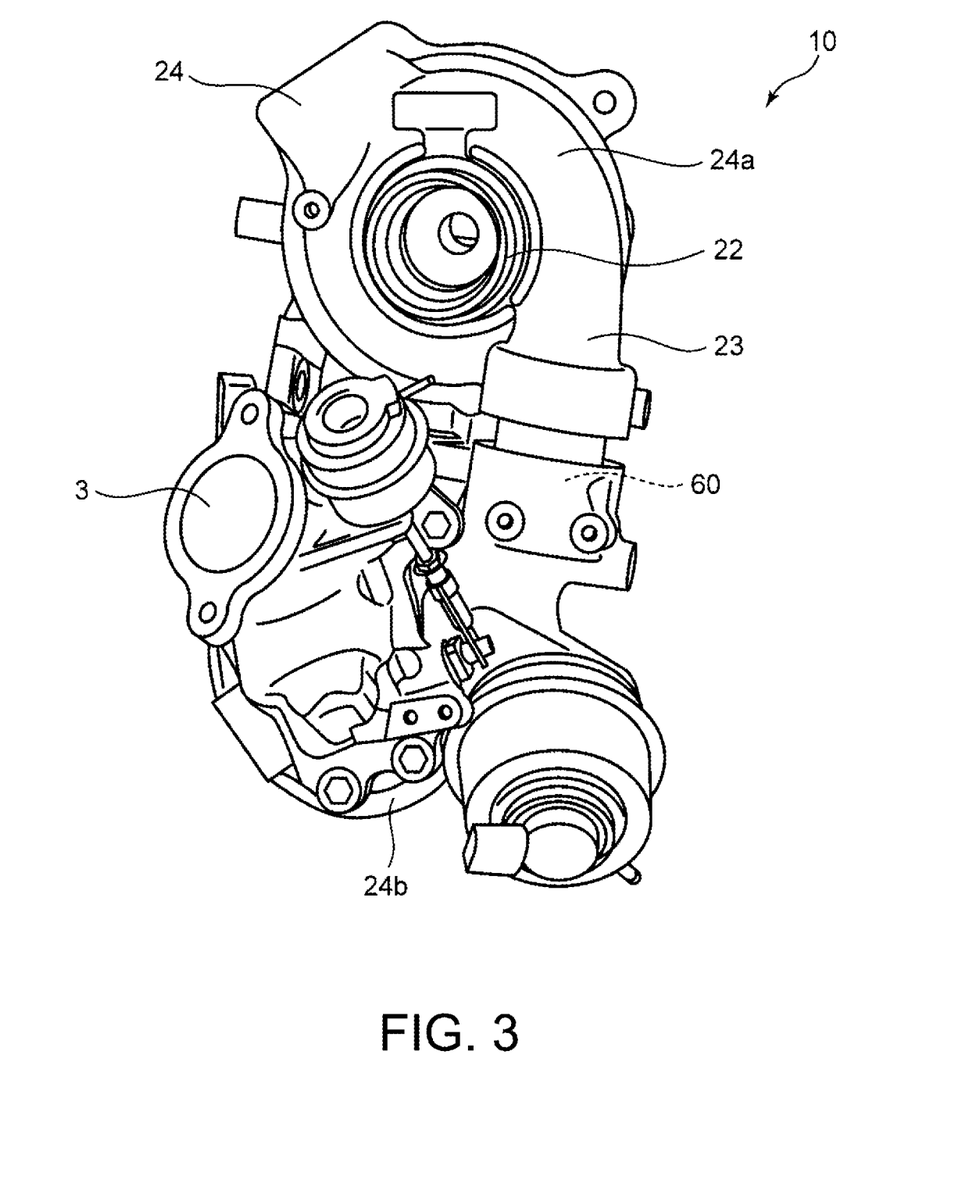
FIG. 3 is a side view illustrating a part of the turbocharging device of the engine for the vehicle.
Figure 4:
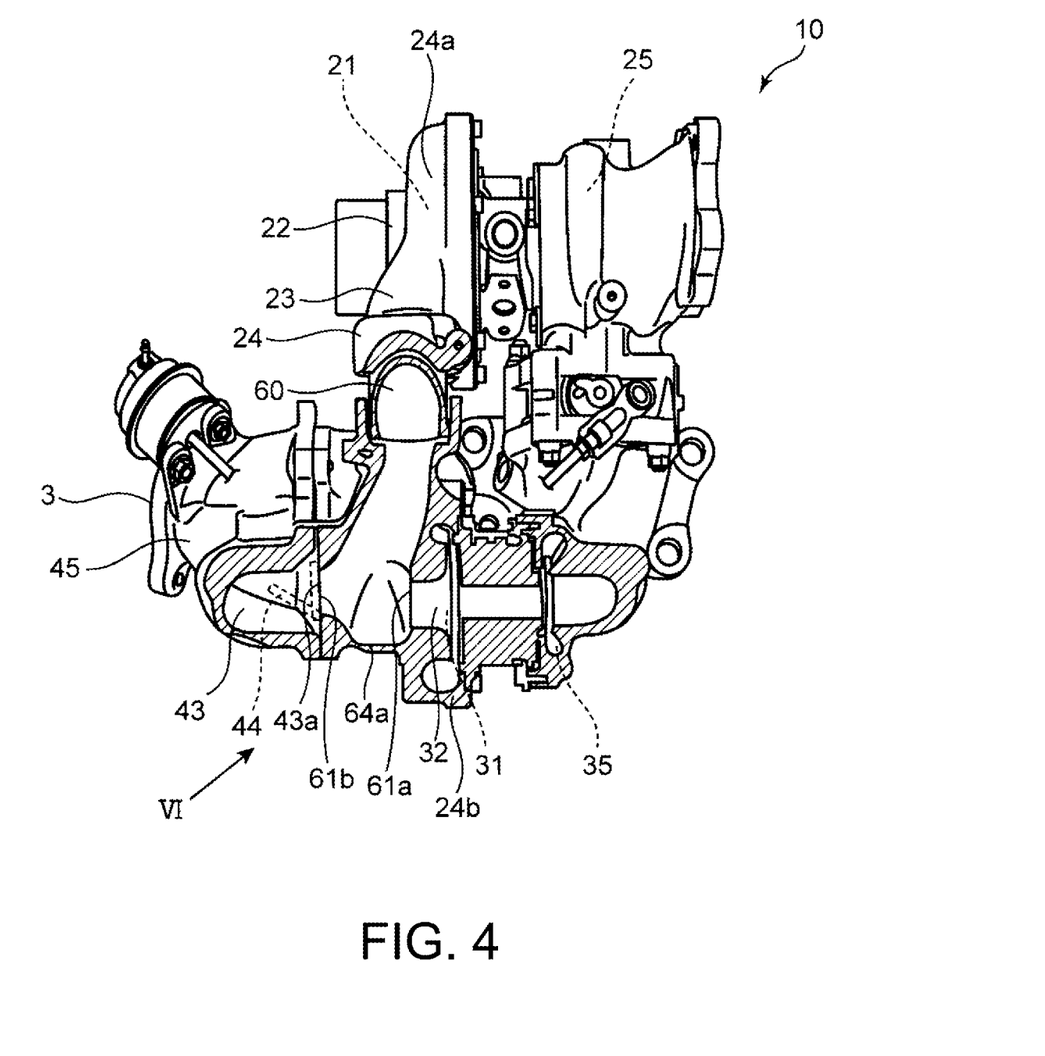
FIG. 4 is a view of FIG. 2 with a portion removed.
Figure 5:
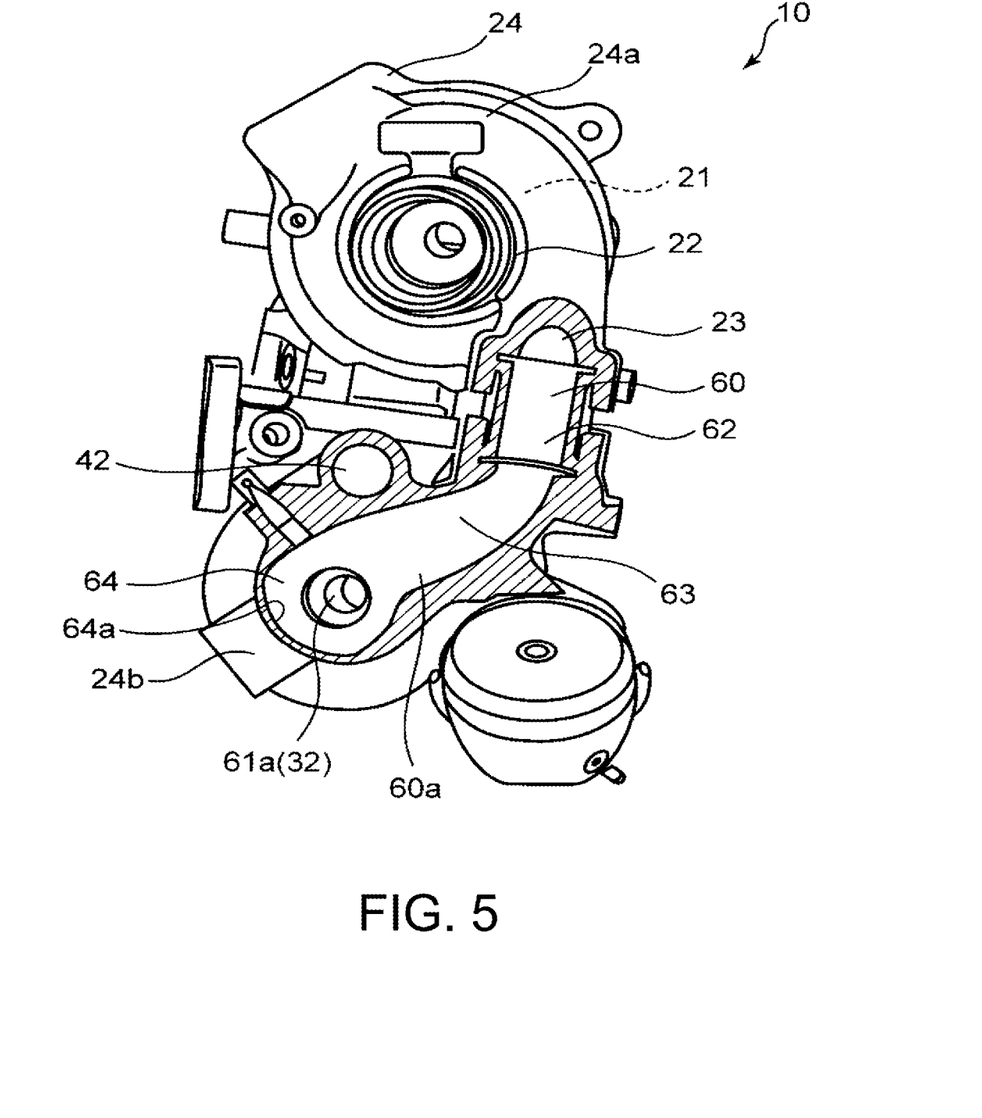
FIG. 5 is a cross-sectional view taken along a line V-V of FIG. 2.
Figure 6:
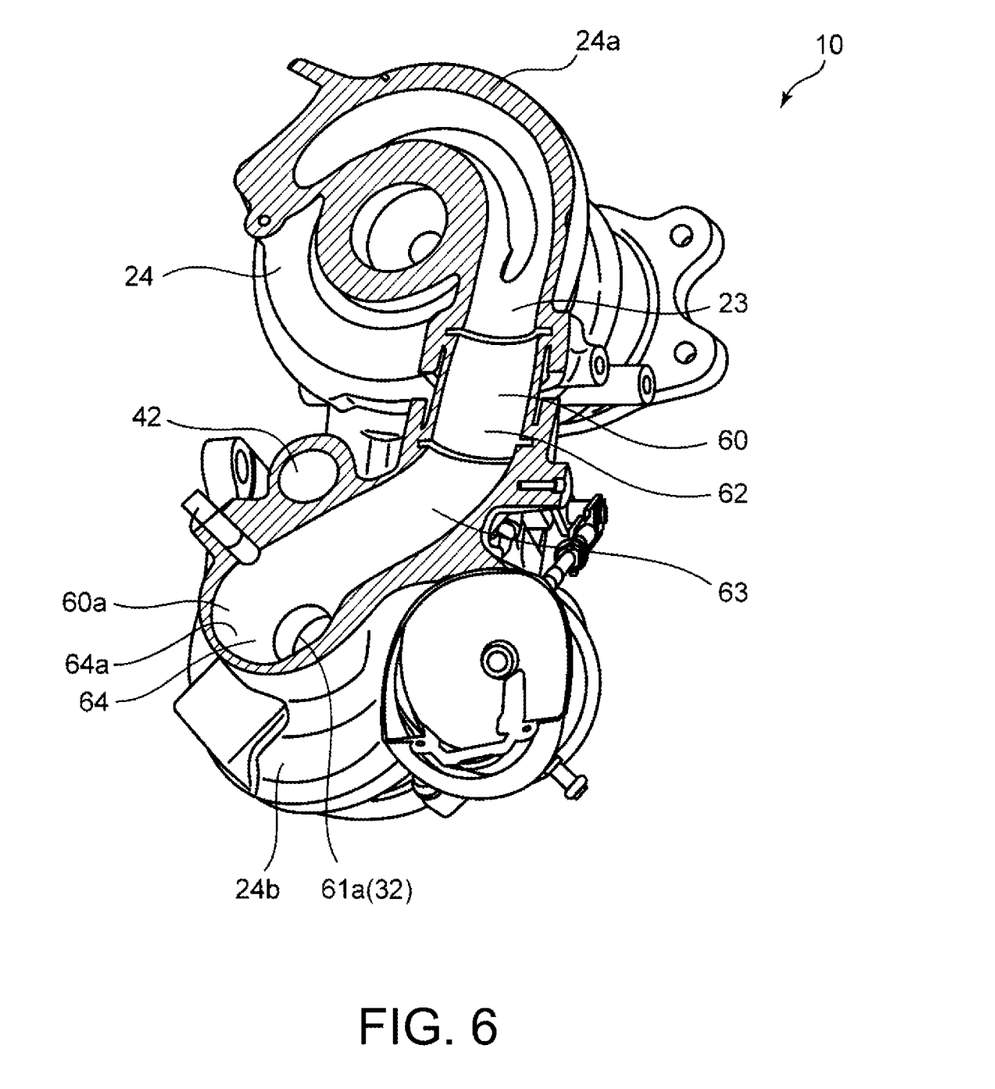
FIG. 6 is a view of FIG. 4 seen in a direction VI.
Figure 7:
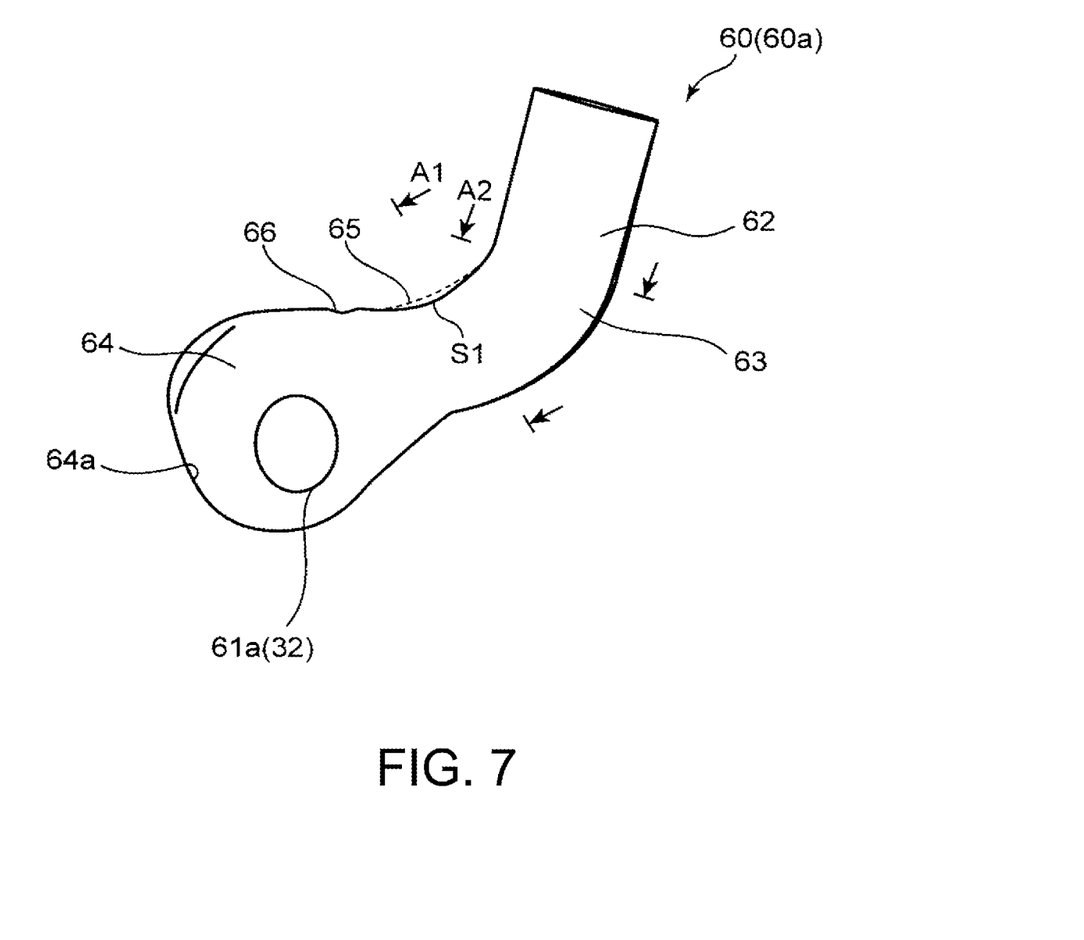
FIG. 7 is a view illustrating an inner circumferential surface of a compressor-to-compressor passage.
Figure 8:
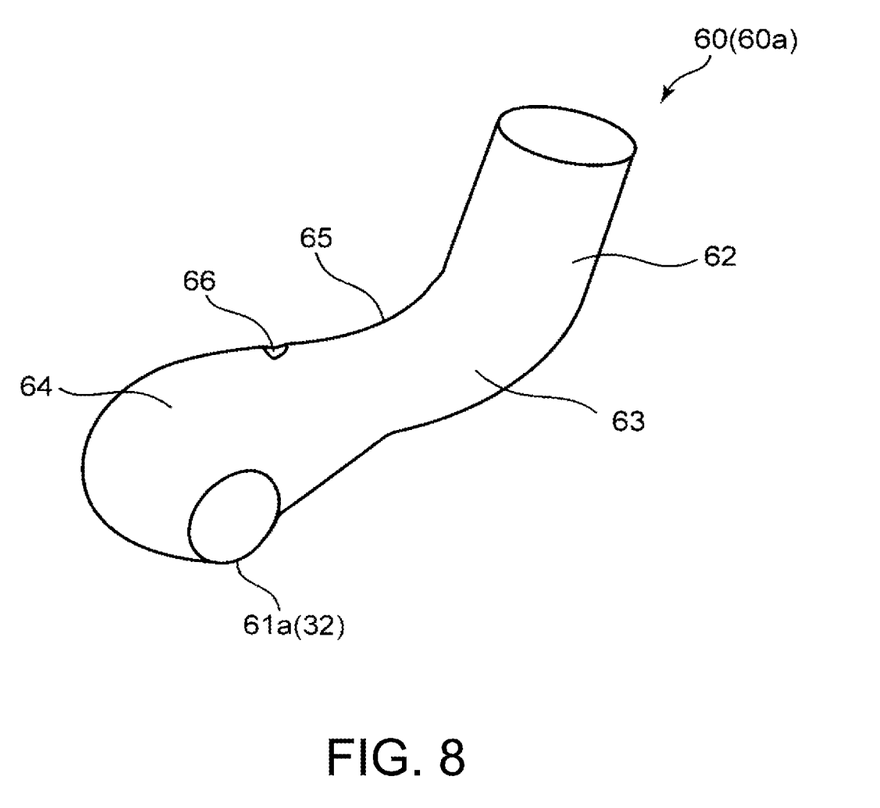
FIG. 8 is another view illustrating the inner circumferential surface of the compressor-to-compressor passage.

A specific configuration of the turbocharging device of this embodiment, particularly a detailed structure of the compressor-to-compressor passage 60 is described with reference to FIGS. 2 to 9. FIG. 2 is a front view illustrating the periphery of the turbochargers 20 and 30. FIG. 3 is a side view illustrating the periphery of the turbochargers 20 and 30. FIG. 4 is a view illustrating an inner circumferential surface of a space formed inside the turbochargers 20 and 30 by removing a portion of FIG. 2. FIG. 5 is a cross-sectional view taken along a line V-V of FIG. 2. FIG. 6 is a view of FIG. 4 seen in a direction VI. FIG. 7 is a view illustrating an inner circumferential surface of the compressor-to-compressor passage 60 seen from the same direction as FIG. 5. FIG. 8 is a view illustrating the inner circumferential surface of the compressor-to-compressor passage 60 seen from the same direction as FIG. 6.

As illustrated in FIGS. 2 and 3, the second turbocharger 30 is arranged below the first turbocharger 20 so that turbine shafts of the turbochargers 20 and 30 are arranged horizontally and overlap with each other in a plan view. Hereinafter, axial directions of the turbine shafts may be referred to as front-and-rear directions in which the compressor side is front and the turbine side is rear. Moreover, directions orthogonal to the front-and-rear directions and upward-and-downward directions, in other words, the left-and-right directions of FIG. 3, are referred to as left-and-right directions in which the right side of FIG. 3 is a right side and the left side of FIG. 3 is a left side.

The first and second compressors 21 and 31 are accommodated inside a compressor housing 24, and the compressor-to-compressor passage 60 is formed in the compressor housing 24.

As illustrated in FIGS. 3 and 5, the discharging section 23 of the first compressor 21 extends downward from a part 24a of the compressor housing 24 where the first compressor 21 is accommodated. The discharging section 23 is opened downward. The introducing section 32 of the second compressor 31 is provided in a central area of a section 24b of the compressor housing 24 where the first compressor 21 is accommodated, and extends horizontally. The introducing section 32 is opened forward.

The compressor-to-compressor passage 60 first extends downward from a lower end of the discharging section 23 of the first compressor 21, and then curves obliquely downward to the left to reach near the introducing section 32 of the second compressor 31. Specifically, the compressor-to-compressor passage 60 includes a straight section 62 (upstream passage) extending downward from the lower end of the discharging section 23 of the first compressor 21 with a fixed flow passage area, a curving section 63 (upstream passage) extending obliquely downward to the left from a lower end of the straight section 62 while curving, and a volume section 64 extending obliquely downward to the left from a downstream end of the curving section 63 and having a larger flow passage area than the other sections of the compressor-to-compressor passage 60.

As illustrated in FIGS. 7 and 8, an inner circumferential surface 60a of the compressor-to-compressor passage 60 has a bottomed cylindrical shape, and the volume section 64 has a bottom face 64a extending substantially orthogonal to the extending direction of the compressor-to-compressor passage 60, in other words, a direction substantially orthogonal to a flow direction of the intake air inside the volume section 64, and with which the intake air collides. An introduction port 61a of the introducing section 32 of the second compressor 31 is formed, in the inner circumferential surface of the volume section 64, in a side face (a rear side face in this embodiment) extending in the extending direction of the compressor-to-compressor passage 60. Therefore, in this embodiment, the intake air that flows into the compressor-to-compressor passage 60 flows downward, then changes its direction horizontally (rearward) in the volume section 64, and flows into the introducing section 32 of the second compressor 31 via the introduction port 61a.

In this embodiment, since the flow passage area of the volume section 64 is set large, the intake air whirls inside the volume section 64 and, thus, can flow into the introducing section 32 smoothly. Moreover, in this embodiment, since the introduction port 61a of the introducing section 32 of the second compressor 31 is formed in the side face extending in the extending direction of the compressor-to-compressor passage 60 as described above, the length of the compressor-to-compressor passage 60 becomes shorter than in a case where the compressor-to-compressor passage 60 is connected to the introducing section 32 in a manner that they extend in the same direction, and thus, the turbocharging device is downsized.

In a part (front side face in this embodiment) of the inner circumferential surface of the volume section 64 opposing the face where the introduction port 61a of the introducing section 32 of the second compressor 31 is formed, an introduction port 61b of the bypass passage 43 is formed near a position opposing the introduction port 61a, and the bypass passage 43 communicates with the compressor-to-compressor passage 60 via the introduction port 61b. Specifically, a front end face of the compressor housing 24 is connected to a bypass valve housing 45 that is formed therein with the bypass passage 43. The bypass passage 43 is opened rearward in a rear end face of the bypass valve housing 45, and this opening 43a is connected to the introduction port 61b to communicate the bypass passage 43 with the compressor-to-compressor passage 60.

The bypass valve housing 45 is provided with the bypass valve 44. In this embodiment, as indicated by one of the dashed lines in FIG. 4, the bypass valve 44 is provided to the communicating section between the bypass passage 43 and the compressor-to-compressor passage 60 to open and close the communicating section. Note that the discharge passage 42 connected to the discharging section 33 of the second compressor 31 is formed over the compressor housing 24 and the bypass valve housing 45.

As illustrated in FIGS. 7 and 8, the throttle part 65 for increasing the flow rate of the intake air passing through the compressor-to-compressor passage 60 is formed in the inner circumferential surface of the curving section 63 of the compressor-to-compressor passage 60. Note that at least one side of the inner circumferential surface of the curving section 63 is formed to extend in a direction of expanding the curving section 63. The throttle part 65 bulges inside the curving section 63 to throttle the flow passage area of the curving section 63. The throttle part 65 is formed in an inner part of the curving section 63, specifically, a part on an inner side inward of a central axis of the curving section in terms of the curvature radius. In other words, in the inner circumferential surface of the curving section 63, the throttle part 65 is formed to a part opposite to the side where the curving section 63 expands. In this embodiment, the curving section 63 expands downward to the right and the throttle part 65 is formed in an upper-left face of the curving section 63. The dashed line in FIG. 7 is a virtual line for a case where the flow passage area of the curving section 63 is fixed in the flow direction, and as it is clear from the comparison to the broken line, in this embodiment, the throttle part 65 is formed over substantially the entire curving section 63 in the flow direction. Specifically, the flow passage area of the curving section 63 is the smallest at a predetermined position 51 downstream of the center of the curving section 63 in the flow direction. Further, the curving section 63 is formed such that the flow passage area becomes gradually smaller from its upstream end toward the smallest flow passage area position 51 and then gradually larger from the smallest flow passage area position 51 to the downstream side.

Figure 9:
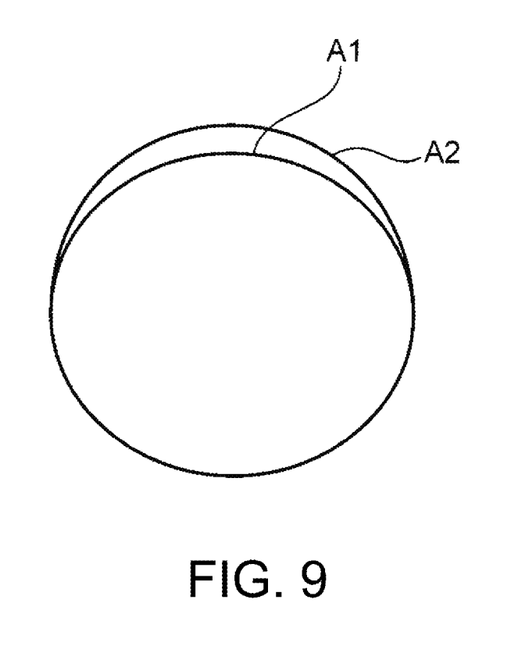
FIG. 9 is a view illustrating a shape of a throttle part.

Moreover, FIG. 9 illustrates a cross section A1 of the section where the throttle part 65 of the curving section is formed (see FIG. 7), and a cross section A2 of the section near the upstream end of the curving section 63 and where the throttle part 65 is not formed (see FIG. 7), in comparison to each other. In FIG. 9, the upper side is the inner side of the curving section 63 and the lower side is the outer side of the curving section 63. As illustrated in FIG. 9, in this embodiment, the throttle part 65 is formed over substantially the entire upper part with respect to a line evenly dividing the curving section 63 into two parts on the inner and outer sides through the center of the curving section 63, in other words, over the semiperimeter of the curving section 63.

As described above, in this embodiment, the throttle part 65 is formed in the curving section 63 of the compressor-to-compressor passage 60, and the flow rate of the intake air passing through the curving section 63 is increased by the throttle part 65. Thus, the flow rate of the intake air passing through the bypass passage 43 located downstream of the curving section 63 is increased, and the oil adhesion on the bypass valve 44 is suppressed.

Particularly, in this embodiment, since the throttle part 65 is formed in the inner part of the curving section 63, the flow inside the entire bypass passage 43 is prevented from being interrupted by the throttle part 65, and the flow rate of the intake air can be increased while stabilizing the flow of the intake air.

Moreover, in this embodiment, in a part of the inner circumferential surface 60a of the compressor-to-compressor passage 60 downstream of a stagnation point P (described later), a protrusion 66 protruding inside the passage is formed, and the flow of the intake air inside the compressor-to-compressor passage 60 is stabilized by the protrusion 66. The protrusion 66 is formed at a position that is in an upper part of the inner circumferential surface of the volume section 64 and downstream of the throttle part 65. Widths of the protrusion 66 in the flow direction and the circumferential direction of the compressor-to-compressor passage 60 are significantly smaller than those of the throttle part 65, and the protrusion 66 is only formed near an inner end (upper end) of the inner circumferential surface of the volume section 64.

Operation and effects of the protrusion 66 are described next.

Due to the throttle part 65 provided to the curving section 63 as described above, the flow rate of the intake air can be increased. Meanwhile, the present inventors carried out experiments in various kinds of engines, and as a result, found that providing the throttle part 65 increased a pressure variation of the intake air in some cases. Through extensive search regarding this matter, phenomena illustrated in FIGS. 10A to 10E occurred, and it was found that these phenomena cause the increase in the pressure variation. FIGS. 10A to 10E are results obtained by numerically calculating the flow inside the compressor-to-compressor passage 60 with the throttle part 65 provided in the curving section 63, and the parts illustrated in darker color indicate lower flow rates. Moreover, FIGS. 10A to 10E are the results from a plurality of timings, and time elapses from FIG. 10A to FIG. 10E.

Figure 10A:
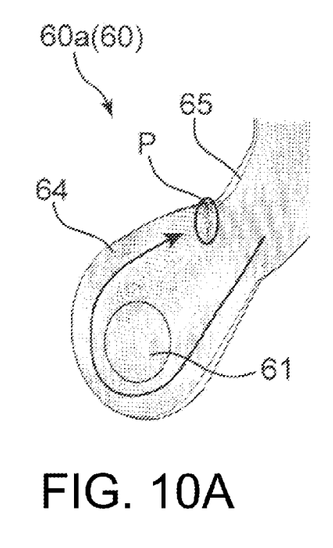
FIGS. 10A to 10E are views illustrating calculation results of a flow inside the compressor-to-compressor passage.
Figure 10B:
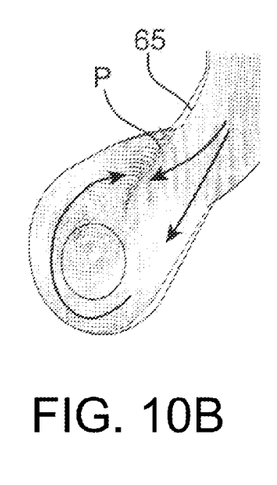
Figure 10C:
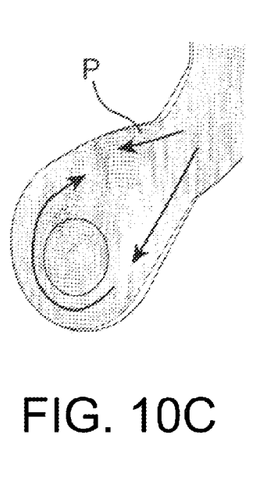
Figure 10D:
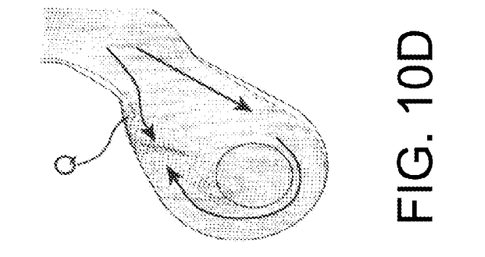
Figure 10E:
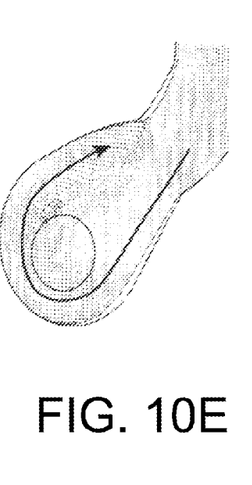

First, as illustrated in FIG. 10A, when intake air at high flow rate flows into the downstream side of the throttle part 65, in other words, the volume section 64, the stagnation point P is generated in a part that is near the connection between the curving section 63 and the volume section 64 and is downstream of the part with the smallest flow passage area of the throttle part 65. However, as indicated by the arrow, the intake air at a high flow rate blown back upward at the bottom face 64a of the volume section 64 collides with the stagnation point P, and as illustrated in FIG. 10B, the stagnation point is resolved by the collision. Then, the speed of the intake air around the position where the stagnation point is generated decreases and a low speed area expands. When fresh intake air at a high flow rate flows in from the upstream side once the low speed area has expanded, as indicated by the arrows of FIG. 10C, the fresh intake air flows to the low speed area, and the speed thereof decreases. Specifically, the fresh intake air at a high flow rate pushes the intake air with a low flow rate back to the downstream side, and thus, a passing area of the fresh intake air expands and the speed of the fresh intake air decreases. When the speed of the fresh intake air decreases, since the speed of the intake air blowing back accordingly decreases, a separation occurs in a downstream part Q (substantially the same position as the stagnation point P) of the throttle part 65 as illustrated in FIG. 10D, and then the stagnation point P regenerates as illustrated in FIG. 10E. After FIG. 10E, the state of the flow returns back to the state in FIG. 10A again. Thus, since the phenomena that the stagnation point P is generated and then resolved, occur repeatedly as illustrated in FIGS. 10A to 10E, the flow of the intake air inside the volume section 64 and, as a result, inside the compressor-to-compressor passage 60, does not become stable and the pressure variation increases.

Figure 11:
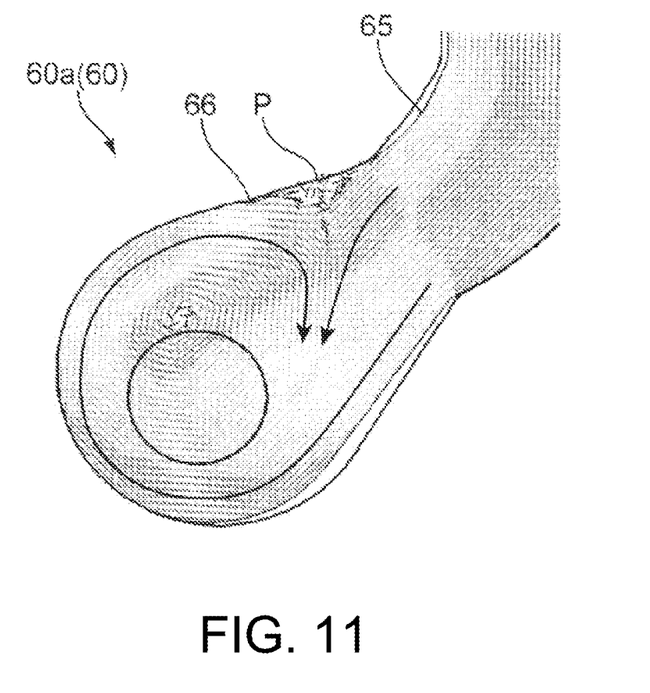
FIG. 11 is a view illustrating a calculation result of the flow inside the compressor-to-compressor passage with the turbocharging device of the engine for the vehicle according to the embodiment of the present invention.

As a result of their extensive research for this problem, the present inventors have invented, as a configuration for avoiding the pressure variation caused by the phenomena, a configuration in which the protrusion 66 protruding inside the passage is formed in the part of the inner circumferential surface 60a of the compressor-to-compressor passage 60 downstream of the stagnation point P as described above. Further, by using this configuration, as illustrated in FIG. 11, a stable flow of the intake air is achieved. Specifically, due to the protrusion 66 formed to protrude inside the passage in the part downstream of the stagnation P, the collision of the intake air blown back at high speed with the stagnation P is avoided, the stagnation P remains stable, and the flow of the intake air is stabilized.

As described above, with the turbocharging device of this embodiment, the flow rate of the intake air flowing into the bypass passage 43 can be increased while the flow of the intake air is stabilized, and the oil adhesion on the bypass valve 44 can surely be suppressed.

Here, the system to which the turbocharging device of the present invention is applied is not limited to the system described above; however, with the configuration in which the first compressor 21 is provided upstream of the bypass passage 43, since the turbocharging by the first compressor 21 causes the increase in the intake air flowing into the bypass passage 43 and, thus, the oil easily becomes sticky, the application of the turbocharging device of the present invention to such a system is effective. Moreover, with the configuration in which the EGR passage 52a is connected upstream of the bypass passage 43, the oil becomes sticky easily due to the increase in the intake air temperature by the EGR gas being circulated back to the intake side through the EGR passage 52a. Therefore, the application of the turbocharging device of the present invention to such a system is effective. Moreover, with the configuration in which the blowby gas introduction passage 53 is connected upstream of the bypass passage 43 and the intake air mixed with blowby gas is introduced into the bypass passage 43, a larger amount of oil flows into the bypass passage 43 and the oil easily adheres on the bypass valve 44. Therefore, the application of the turbocharging device of the present invention to such a system is effective.

Moreover, the position of the throttle part 65 is not limited to the position described above; however, if it is provided to the inner part of the curving section, the interruption of the flow of the intake air by the throttle part 65 can be avoided more surely, and stable flow of the intake air can be maintained.

Moreover, the protrusion 66 can be omitted. Note that, in the case where the intake air blows back and the pressure pulsation of the intake air is increased thereby as described above, it is preferred to provide the protrusion 66 and suppress the pressure pulsation.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

10 Turbocharging Device of Engine for Vehicle
20 First Turbocharger (Upstream Turbocharger)
30 Second Turbocharger (Turbocharger)
43 Bypass Passage
60 Compressor-to-Compressor Passage
65 Throttle Part
66 Protrusion

What is claimed is:

1. A turbocharging device of an engine for a vehicle, comprising:
a turbocharger for turbocharging intake air;
an introduction passage connected to an introducing section of a compressor of the turbocharger so as to introduce air flow to the compressor;
a discharge passage connected to a discharging section of the compressor of the turbocharger;
a bypass passage connecting the introduction passage to the discharge passage and bypassing the compressor;
a bypass valve for opening and closing the bypass passage, and
an upstream turbocharger for turbocharging intake air,
wherein a throttle part throttling a flow passage area of the introduction passage is formed in an inner circumferential surface of a part of the introduction passage, upstream of a connection part of the introduction passage with the bypass passage, such that the throttle part has a curving section wherein the flow passage area gradually becomes smaller from an upstream side to a downstream side,
wherein the introduction passage connects a discharging section of a compressor of the upstream turbocharger to the introducing section of the turbocharger, and
wherein an EGR passage for recirculating exhaust gas discharged from the engine is connected to an intake passage connected to an introducing section of the compressor of the upstream turbocharger".

2. The turbocharging device of claim 1, wherein a curving section is formed in an inner circumferential surface of the introduction passage, and
wherein the throttle part is formed in a part of the curving section, on an inner side inward of a central axis of the curving section in terms of a curvature radius.

3. The turbocharging device of claim 2, wherein an EGR passage for recirculating exhaust gas discharged from the engine is connected to an intake passage connected to the introducing section of the compressor of the turbocharger.

4. The turbocharging device of claim 2, wherein a blowby gas introduction passage for introducing blowby gas into an intake passage connected to the introducing section of the compressor of the turbocharger is connected to the intake passage.

5. The turbocharging device of claim 1, wherein a blowby gas introduction passage for introducing blowby gas into an intake passage connected to the introducing section of the compressor of the turbocharger is connected to the intake passage.

6. The turbocharging device of an engine for a vehicle, comprising:
a turbocharger for turbocharging intake air;
an introduction passage connected to an introducing section of a compressor of the turbocharger;
a discharge passage connected to a discharging section of the compressor of the turbocharger;
a bypass passage connecting the introduction passage to the discharge passage and bypassing the compressor; and
a bypass valve for opening and closing the bypass passage,
wherein a throttle part throttling a flow passage area of the introduction passage is formed in an inner circumferential surface of a part of the introduction passage, upstream of a connection part of the introduction passage with the bypass passage,
wherein the introduction passage includes an upstream passage and a volume section having a bottom face where the intake air passed through the upstream passage blows back to an upstream side, and
wherein a protrusion protruding inside the introduction passage is formed in a part of an inner circumferential surface of the introduction passage, downstream of a stagnation point of the intake air blowing back upward from the bottom face of the volume section.

7. The turbocharging device of claim 6, wherein a blowby gas introduction passage for introducing blowby gas into an intake passage connected to the introducing section of the compressor of the turbocharger is connected to the intake passage.

8. The turbocharging device of an engine for a vehicle, comprising:
- a turbocharger for turbocharging intake air;
- an introduction passage connected to an introducing section of a compressor of the turbocharger;
- a discharge passage connected to a discharging section of the compressor of the turbocharger;
- a bypass passage connecting the introduction passage to the discharge passage and bypassing the compressor;
- a bypass valve for opening and closing the bypass passage; and
- an upstream turbocharger for turbocharging intake air,
- wherein a throttle part throttling a flow passage area of the introduction passage is formed in an inner circumferential surface of a part of the introduction passage, upstream of a connection part of the introduction passage with the bypass passage,
- wherein the introduction passage connects a discharging section of a compressor of the upstream turbocharger to the introducing section of the turbocharger,
- wherein the introduction passage includes an upstream passage and a volume section having a bottom face where the intake air passed through the upstream passage blows back to an upstream side, and
- wherein a protrusion protruding inside the introduction passage is formed in a part of an inner circumferential surface of the introduction passage, downstream of a stagnation point of the intake air blowing back upward from the bottom face of the volume section.

9. The turbocharging device of an engine for a vehicle, comprising:
- a turbocharger for turbocharging intake air;
- an introduction passage connected to an introducing section of a compressor of the turbocharger;
- a discharge passage connected to a discharging section of the compressor of the turbocharger;
- a bypass passage connecting the introduction passage to the discharge passage and bypassing the compressor; and
- a bypass valve for opening and closing the bypass passage;
- wherein a throttle part throttling a flow passage area of the introduction passage is formed in an inner circumferential surface of a part of the introduction passage, upstream of a connection part of the introduction passage with the bypass passage,
- wherein a curving section is formed in an inner circumferential surface of the introduction passage,
- wherein the throttle part is formed in a part of the curving section, on an inner side inward of a central axis of the curving section in terms of a curvature radius,
- wherein the introduction passage includes an upstream passage and a volume section having a bottom face where the intake air passed through the upstream passage blows back to an upstream side, and
- wherein a protrusion protruding inside the introduction passage is formed in a part of the inner circumferential surface of the introduction passage, downstream of a stagnation point of the intake air blowing back upward from the bottom face of the volume section.

* * * * *